United States Patent [19]

Miyoshi et al.

[11] Patent Number: 5,395,864
[45] Date of Patent: Mar. 7, 1995

[54] WET FRICTIONAL MATERIAL CONTAINING ACTIVATED CARBON FIBER

[75] Inventors: Tatsuro Miyoshi; Shun Kitahara; Shigeki Umezawa, all of Shizuoka, Japan

[73] Assignee: Nsk-Waner Kabushiki Kaisha, Japan

[21] Appl. No.: 79,997

[22] Filed: Jun. 18, 1993

[30] Foreign Application Priority Data

Jun. 22, 1992 [JP] Japan .................. 4-185685

[51] Int. Cl.⁶ ................................. C08J 5/14
[52] U.S. Cl. ........................... 523/155; 523/156; 524/495; 524/496
[58] Field of Search ............... 428/375, 396; 523/155, 523/156; 524/495, 496

[56] References Cited

U.S. PATENT DOCUMENTS 4,362,646 12/1982 Ikegami et al. .................. 252/422
4,451,590 5/1984 Fujimaki et al. .................. 523/155

FOREIGN PATENT DOCUMENTS 56-161429 12/1981 Japan .
2-14223 1/1990 Japan .

*Primary Examiner*—George F. Lesmes
*Assistant Examiner*—Christopher W. Raimund
*Attorney, Agent, or Firm*—Pearne, Gordon, McCoy & Granger

[57] ABSTRACT

A wet frictional material comprises a fiber base material such as natural pulp fibers or organic synthetic fibers, a filler such as diatomaceous earth or cashew resin, a friction adjustment agent, thermosetting synthetic resin, and activated carbon fibers so that the wet frictional material is high in friction coefficient and superior in heat resistance.

4 Claims, 3 Drawing Sheets

WET FRICTIONAL MATERIAL CONTAINING ACTIVATED CARBON FIBER

BACKGROUND OF THE INVENTION

1. Field of the Invention

The invention relates to a wet frictional material for use in a clutch and a brake in a wet-frictional engagement apparatus.

2. Description of the Prior Art

FIG. 6 shows an example of the configuration of a wet-frictional engagement apparatus. In the drawing, torque is transmitted through contact between driving plates 2 fitted in a spline portion 51 of a hub 5 inserted onto an input shaft 6 and driven plates 1 fitted in a spline portion 41 of a retainer 4. The reference numeral 3 designates a pressure plate and the reference numeral 7 designates a piston for pressing.

Presently, such a frictional engagement apparatus is required so that the apparatus is small in size and light in weight in view of problems of energy, environment, the apparatus is small in operation shock, and the apparatus is high in torque capacity. Further, the frictional engagement apparatus is required to cope with realization of high-energy car engine with realization of high rotational speed and high output thereof. The above-described requirements are extremely strong.

In the conventional frictional engagement apparatus, an additive for reducing the friction coefficient is mixed to lubricating oil to suppress self-induced vibration, for example, vibration of a clutch using slip control to thereby reduce fuel consumption rate. Further, lubricating oil containing an additive for reducing the friction coefficient has been widely used in order to reduce an operation shock, and, therefore, miniaturization of the frictional engagement apparatus inevitably causes low torque capacity. Accordingly, since the operational pressing force is made high to increase the torque capacity, it is necessary to take the safety factor into consideration in order to solve the following problems: resulting in defects relating to reduction of the separation life of a wet frictional material, generation of heat spots and thermal deformation in a mate-frictional surface (driven surface), increase in size of an oil pump, endurance life such as leakage of operational oil. In addition, it is difficult to reduce the size of the apparatus per se.

In the prior art, there has been a problem to be solved in that the frictional material corresponding to the above-described frictional engagement apparatus tends to be thermally disadvantageous if the friction coefficient is made to be high, while, on the other hand, the frictional characteristic will deteriorate to thereby generate self-induced vibration if the high heat resistance is required. It has been difficult to establish compatibility between the high friction coefficient and the high heat resistance.

SUMMARY OF THE INVENTION

To solve the above problem in the prior art, an object of the invention is to provide a wet frictional material which is high in friction coefficient high and superior in heat resistance.

In order to achieve the above object, according to the invention, a wet frictional material comprises fiber base member which is a base material for mixing filler member, friction adjustment member, thermosetting synthetic resin and activated carbon fibers, the filler member, the friction adjustment member, the thermosetting synthetic resin for binding said fiber base member, said filler member, said friction adjustment member and said activated carbon fibers and the activated carbon fibers.

When activated carbon having a large specific surface area is mixed to a frictional material, the frictional material selectively absorbs an additive for reducing the friction coefficient to thereby increase the friction coefficient on a frictionally sliding surface.

On the other hand, at the time of releasing a clutch, the frictional material releases the absorbed additive so as not to give influence to the quantity of the additive in lubricating oil. This function exhibits effects through compatible realization of increasing the specific surface area (including the surface areas inside holes because of its porosity) of activated carbon (for example, 2500 $m^2/g$) and of increasing the contacting area of the activated carbon with the frictional sliding surface.

Moreover, activated carbon is superior in heat conduction in comparison with a fiber base material such as natural pulp fibers, organic synthetic fibers, and the like. If such activated carbon is mixed to the fiber base material to form a frictional material, frictional heat is diffused so as to prevent local thermal transformation (called a heat spot) of a mate frictional plate. Therefore, it is possible to produce a thermally advantageous frictional material.

The activated carbon fibers defined in the invention means those having a fiber diameter in a range of from 1 $\mu$m to 50 $\mu$m and a fiber length in a range of from 0.1 mm to 30 mm, and it is suitable to make the mixing ratio of activated carbon fibers in the frictional material be within a range not larger than 40 weight %. If the value of the mixing ratio exceeds the above range, the frictional material becomes not practical in view of the price and performance.

Conventionally, there was a case in which granular activated carbon such as activated carbon of palm husks or the like is mixed in a frictional material. In such a case, however, it is difficult to make the inside distribution of the activated carbon uniform at the time of producing the frictional material because the activated carbon is in the form of grains and when the frictional material is operated as a frictional clutch, it is difficult for the frictional material to always keep stable frictional characteristic because the granular activated carbon may come off from between fibers. Further, even if the mixing ratio of the activated carbon is increased to make the friction coefficient high, the activated carbon comes into point contact with the frictional sliding surface because the activated carbon is in the form of the grains so that there is hardly produced an effect of making the friction coefficient high. If the mixing ratio of the activated carbon is further increased, the inter-fiber force is weakened to reduce the strength of the frictional material so that the frictional material cannot be used as a clutch.

Further, even if the quantity of resin component is increased to establish such a high mixing ratio of the activated carbon, there is a disadvantage in that the resin component is plasticized (made like a mirror surface) on the surface of the frictional material by heat generation so that the friction coefficient is lowered. According to the invention, all the above-described problems can be solved by making activated carbon fibers.

As the above wet frictional material, that of the type produced through a paper-making method is known. The frictional material of such a type is produced in a manner such that natural pulp fibers, organic synthetic fibers, or the like are used as the fiber base material, a filler and a friction adjustment agent are mixed to the fiber base material, the mixture is subjected to paper-making process to produce raw paper, and after the raw paper is impregnated with thermosetting synthetic resin and dried, the resin is hardened by heating.

The thermosetting synthetic resin functions as a binder for the fibers or the like constituting compound fiber paper. As the resin of this kind, phenol resin, epoxy resin, urea resin, melamine resin, silicone resin, and the like may be used.

The filler is a inert material for improving strength, durability and the like of a plastic. As the filler of this kind, diatomaceous earth, cashew resin, clay, silica lime, carbonate and the like may be used.

As the frictional adjustment material, synthetic resin particles, rubber particles, graphite, coke and the like may be used.

DETAILED DESCRIPTION OF THE PREFERRED EMBODIMENT

In the invention, by using the above-described activated carbon fibers, the frictional material gives not rigidity but elasticity to a frictional sliding surface so that stabilization of the friction coefficient in a low- and a high-temperature region, establishment of high friction coefficient, and accomplishment of high heat resistance are realized at the same time through the sliding surface smoothing effect and the additive's breathing action which is one of the features of activated carbon fibers.

The preferable range of the mixing quantities according to the fundamental mixing technique is as follows.

| (Preferable mixing example) | |
|---|---|
| natural pulp and organic synthetic fiber | 20–60 weight % |
| phenol resin | 10–40 weight % |
| activated carbon fiber | 1–40 weight % |
| friction adjustment agent and filler | 5–50 weight % |
| total | 100 weight % |

The invention provides a frictional material which is widely different in effect from a frictional material of the type containing no activated carbon fibers.

| Example ($L_1$) | |
|---|---|
| natural pulp and organic synthetic fiber | 30 weight % |
| phenol resin | 15 weight % |
| activated carbon fiber | 15 weight % |
| friction adjustment agent and filler | 40 weight % |
| total | 100 weight % |

Conventional Examples will be described for the purpose of comparison with the Example.

| Conventional Example 1 ($L_2$) | |
|---|---|
| natural pulp and organic synthetic fiber | 45 weight % |
| phenol resin | 15 weight % |
| frictional adjustment agent and filler | 40 weight % |
| total | 100 weight % |
| Conventional Example 2 ($L_3$) | |
| natural pulp and organic synthetic fiber | 30 weight % |
| phenol resin | 15 weight % |
| granular activated carbon | 15 weight % |
| friction adjustment agent and filler | 40 weight % |
| total | 100 weight % |

The producing method is as follows. After the above-described mixing raw materials were uniformly mixed with each other in a mixer, the mixture was subjected to paper-making process in a paper-making apparatus and then dried to obtain composite fiber paper having thickness of 0.5 mm. Next, the paper was impregnated with the phenol resin and the phenol resin was then hardened to produce a frictional material.

In order to investigate the effects of the frictional material according to the invention, the frictional material was annularly punched and bonded on a steel plate to produce a test piece.

Figure 6:
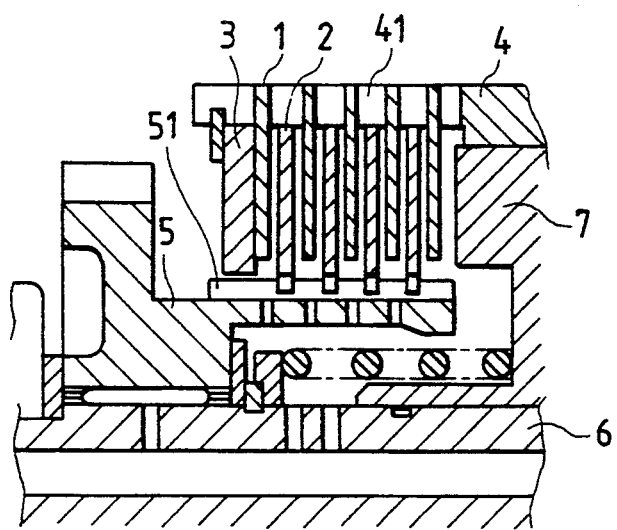
FIG. 6 is a side sectional view showing an example of the wet-frictional engagement apparatus.

Each of the frictional material $L_1$ according to the invention and the conventional frictional materials $L_2$ and $L_3$ was bonded on each of the opposite surfaces of the driving plate 2 of FIG. 6. The driving plate 2 carrying the frictional materials was set in an inertia absorption test machine so that the test pieces were subjected to intermittently friction-engagement to carry out performance comparison test. In this test, with respect to the mode values such as friction engagement time, rest time and the like, the conditions similar to those in the case of actual mounting in the same manner of actual car test.

Figure 1:
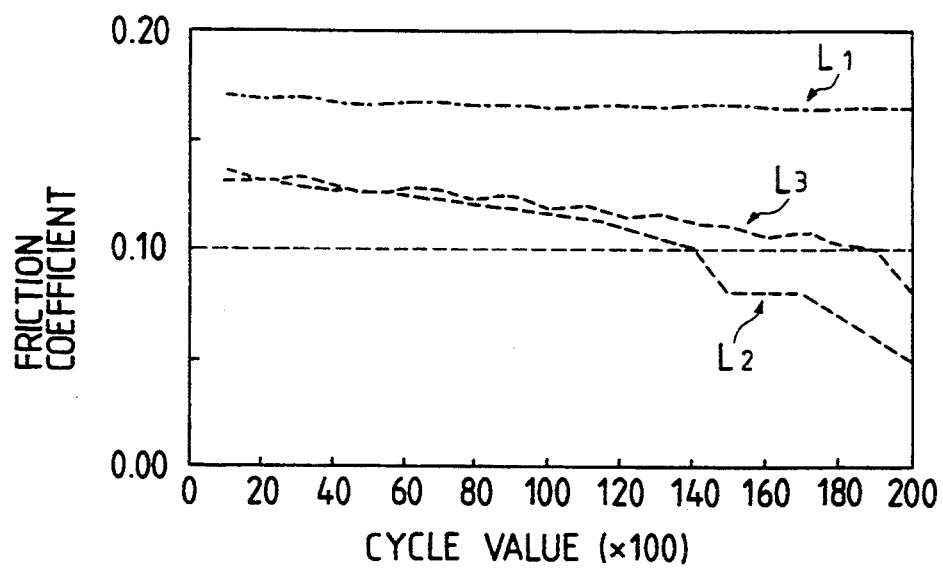
FIG. 1 is a graph showing the endurance life of each of frictional materials.

FIG. 1 shows the endurance life of each of the frictional materials on the basis of high energy valuation. The quality of material $L_1$ of the invention is stable while keeping high friction coefficient in comparison with the conventional qualities of material $L_2$ and $L_3$ as shown as the comparison examples.

Figure 2:
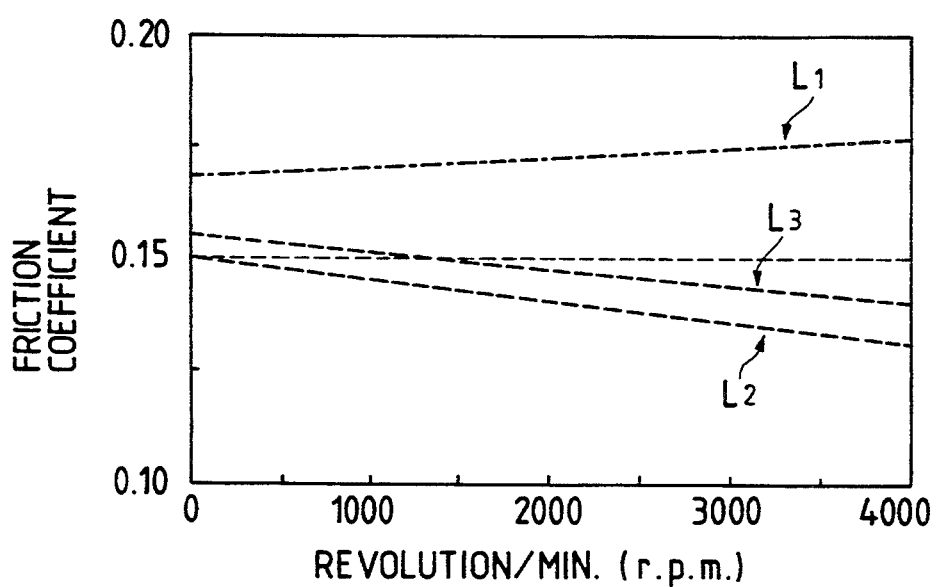
FIG. 2 is a graph showing variations of the friction coefficient with changes of the rotational speed.

FIG. 2 shows variations of the friction coefficient with changes of the rotational speed which may be the index of a shock in friction engagement. Only the quality of material $L_1$ of the invention has a right upward slope and shows the fact that the quality of material $L_1$ is more advantageous against a shock.

Figure 3:
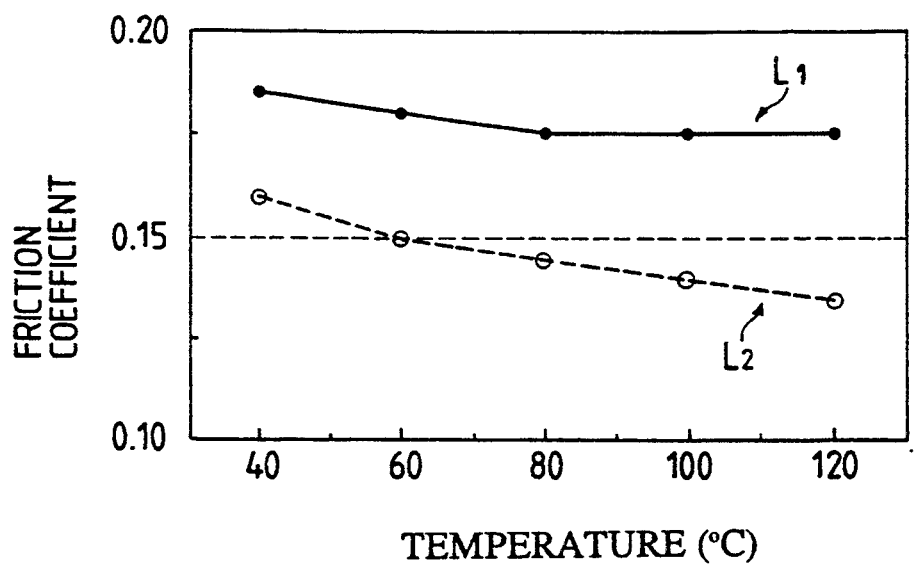
FIG. 3 is a graph showing variations of the friction coefficient with changes of the temperature.

FIG. 3 shows variations of the friction coefficient with temperature changes under the conditions of FIGS. 1 and 2. The quality of material $L_1$ according to the invention does not show a large reaction against temperature changes, can suppress capacity Changes of the friction engagement apparatus due to changes of the temperature environment, can make the safety factor of set capacity small, and can reduce a speed varying shock which is a difference between the set and the actual capacity.

Figure 4:
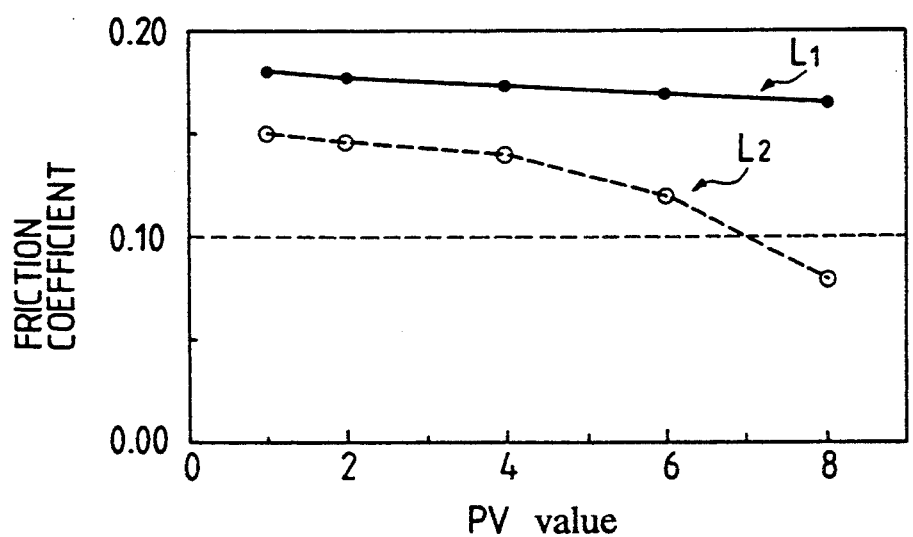
FIG. 4 is a graph showing variations of the friction coefficient when the PV value was changed.

FIG. 4 shows variations of the friction coefficient when the slip torque and the number of slip revolutions were variously changed. The abscissa represents PV value. The PV value of the abscissa is expressed by:

PV=TN/1000 where T represents slip torque and N represents the number of slip revolutions. The lubricating oil temperature at this time was in a range of from 120° C. to 140° C.

Figure 5:
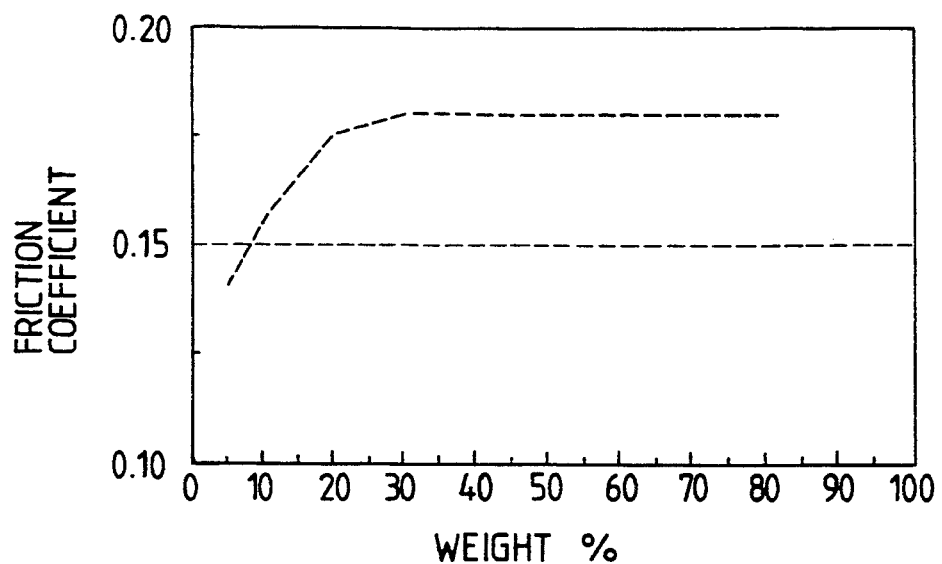
FIG. 5 is a graph showing the relation between the mixing weight percent and friction coefficient of the activated carbon fibers.

FIG. 5 shows the relation between the mixing weight percent and friction coefficient of the activated carbon fibers according to the invention. Since the friction coefficient becomes a fixed value when the weight % of the activated carbon fibers becomes about 20 to 30%, the object to obtain the maximum friction coefficient can be attained when 40 weight % activated carbon fibers are added even if scattering is taken into consideration.

As described above, according to the invention, activated carbon fibers with the above-described mixing ratio are used as one of the constituent materials so that it is possible to obtain a wet frictional material having high friction coefficient, high stability of the friction coefficient, and superior heat resistance.

What is claimed is:

1. A wet frictional material comprising: fiber base member, filler member, friction adjustment member, thermosetting synthetic resin and 1 to 40% by weight of activated carbon fibers, wherein said activated carbon fibers have diameters in a range of from about 1 μm to about 50 μm and lengths in a range of from about 0.1 mm to about 30 mm; said fiber base member, said filler member, friction adjustment member, and said activated carbon fibers being bound to each other by said thermosetting synthetic resin.

2. A wet frictional material as claimed in claim 1 wherein said thermosetting synthetic resin comprises at least one of phenol resin, epoxy resin, urea resin, melamine resin and silicone resin.

3. A wet frictional material as claimed in claim 1 wherein filler comprises at least one of diatomaceous earth, cashew resin, clay, silica lime and carbonate.

4. A wet frictional material as claimed in claim 1 wherein said frictional adjustment material comprises at least one of synthetic resin particles, rubber particles, graphite and coke.

* * * * *